US012750739B2

(12) United States Patent
Fu et al.

(10) Patent No.: US 12,750,739 B2
(45) Date of Patent: Sep. 29, 2026

(54) METHOD FOR QoS INFORMATION TRANSMISSION AND NETWORK DEVICE

(71) Applicant: GUANGDONG OPPO MOBILE TELECOMMUNICATIONS CORP., LTD., Dongguan (CN)

(72) Inventors: Zhe Fu, Dongguan (CN); Shukun Wang, Dongguan (CN); Fei Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 471 days.

(21) Appl. No.: 18/327,411

(22) Filed: Jun. 1, 2023

(65) Prior Publication Data

US 2023/0308955 A1 Sep. 28, 2023

Related U.S. Application Data

(63) Continuation of application No. PCT/CN2020/134036, filed on Dec. 4, 2020.

(51) Int. Cl.
*H04W 28/24* (2009.01)
*H04W 28/02* (2009.01)
*H04W 76/10* (2018.01)

(52) U.S. Cl.
CPC ....... *H04W 28/24* (2013.01); *H04W 28/0268* (2013.01); *H04W 76/10* (2018.02)

(58) Field of Classification Search
CPC . H04W 28/24; H04W 36/0044; H04W 76/10; H04W 28/0268; H04W 76/15; H04W 76/12
See application file for complete search history.

(56) References Cited

U.S. PATENT DOCUMENTS

| | | | | |
|---|---|---|---|---|
| 2020/0275302 | A1* | 8/2020 | Youn | H04W 28/24 |
| 2022/0124550 | A1* | 4/2022 | Yang | H04W 76/12 |
| 2022/0159605 | A1* | 5/2022 | Li | H04W 76/10 |
| 2022/0256395 | A1* | 8/2022 | Sun | H04W 28/10 |

(Continued)

FOREIGN PATENT DOCUMENTS

| | | |
|---|---|---|
| CN | 109891829 | 6/2019 |
| CN | 111200859 | 5/2020 |

(Continued)

OTHER PUBLICATIONS

"3rd Generation Partnership Project; Technical Specification Group Services and System Aspects; Study on enhancement of network slicing; Phase 2 (Release 17)," 3GPP TS 23.700-40, Jun. 2020, v0.4.0.

(Continued)

*Primary Examiner* — Syed Ali
(74) *Attorney, Agent, or Firm* — Hodgson Russ LLP

(57) ABSTRACT

A method for quality of service (QoS) information transmission and a network device are provided, relating to the field of mobile communication. The method includes the following. A first entity transmits first QoS information to a second entity, where the first QoS information is used for ensuring requirement or restriction on a first network slice or a first network slice group for a terminal, and the first QoS information includes a slice maximum bitrate (SMBR).

7 Claims, 5 Drawing Sheets

(56) References Cited

U.S. PATENT DOCUMENTS

2022/0286895 A1* 9/2022 Lee .................. H04W 28/0257
2022/0312509 A1* 9/2022 Kim ...................... H04W 76/10
2022/0353729 A1* 11/2022 Liang .................... H04W 28/02
2022/0361039 A1* 11/2022 Kim .................. H04W 28/0268
2022/0377702 A1* 11/2022 Chun .................... H04W 76/30
2022/0408162 A1* 12/2022 Jia ...................... H04N 21/6408
2023/0018974 A1* 1/2023 Wu ................... H04W 28/0268
2023/0023135 A1* 1/2023 Liu ......................... H04W 4/00
2023/0171652 A1* 6/2023 Zhang ................. H04W 36/362 370/331
2023/0179975 A1* 6/2023 Pateromichelakis ... H04W 4/50 709/217
2023/0180061 A1* 6/2023 Natarajan ............. H04W 28/20 370/235
2023/0261996 A1* 8/2023 Báder ................. H04L 41/0894 370/236
2023/0284128 A1* 9/2023 Yan ......................... H04W 4/40 370/329
2023/0337043 A1* 10/2023 Pateromichelakis ........................ H04W 28/0263
2023/0370902 A1* 11/2023 Wang ................ H04W 28/0268
2025/0203447 A1* 6/2025 Qiao ..................... H04W 76/27

FOREIGN PATENT DOCUMENTS

WO 2019174735 9/2019
WO 2020186145 9/2020

OTHER PUBLICATIONS

"3rd Generation Partnership Project; Technical Specification Group Radio Access Network; NG-RAN; NG Application Protocol (NGAP) (Release 15)," 3GPP TS 38.413, Dec 2018, v15.2.0.

"3rd Generation Partnership Project; Technical Specification Group Radio Access Network; NG-RAN; Xn application protocol (XnAP) (Release 16)," 3GPP TS 38.423, Sep. 2020, v16.3.0.

Huawei et al., "KI#3, new Sol: Solution on limitation of data rate per Network Slice in UL and DL per UE," 3GPP TSG-WG SA2 Meeting #139E e-meeting, S2-2003892 (revision of S2-200xxxx), Jun. 2020.

Huawei et al., "Discussion on restricting the rate per UE per network slice," 3GPP TSG-RAN WG2 Meeting #112 electronic, R2-2010183, Nov. 2020.

WIPO, International Search Report and Written Opinion for International Application No. PCT/CN2020/134036, Sep. 6, 2021.

"3rd Generation Partnership Project; Technical Specification Group Services and System Aspects; Study on enhancement of network slicing; Phase 2 (Release 17)," 3GPP TR 23.700-40, Nov. 2020, v1.2.0.

Nokia et al., "Comparison of solution 37 and 22 with and without DC," 3GPP TSG-RAN WG3#110, R3-207209, Nov. 2020.

EPO, Extended European Search Report for EP Application No. 20964039.0, Dec. 5, 2023.

EPO, Communication for EP Application No. 20964039.0, Aug. 2, 2024.

* cited by examiner

METHOD FOR QoS INFORMATION TRANSMISSION AND NETWORK DEVICE

CROSS-REFERENCE TO RELATED APPLICATION(S)

This application is a continuation of International Application No. PCT/CN2020/134036, filed Dec. 4, 2020, the entire disclosure of which is incorporated herein by reference.

TECHNICAL FIELD

This disclosure relates to the field of mobile communication, and particularly to a method for quality of service (QoS) information transmission and a network device.

BACKGROUND

Strong demand of vertical markets on wireless communication is conspicuous. In order to meet requirements of vertical industries on delay, mobility, reliability, location accuracy, etc., a radio access network (RAN) needs to enhance access-network support for vertical services. One way is based on network slicing, which can serve multiple services with different requirements at lower latency, higher goal-orientation, higher flexibility, and higher scalability.

Therefore, it is desirable to provide enhanced network slicing to support services of application providers.

SUMMARY

According to an aspect of the disclosure, a method for QoS information transmission is provided. The method includes the following. A first entity transmits first QoS information to a second entity, where the first QoS information is used for ensuring requirement or restriction on a first network slice ("slice" for short) or a first network slice group for a terminal, and the first QoS information includes a slice maximum bitrate (SMBR).

According to an aspect of the disclosure, a network device is provided. The network device includes a processor, a transceiver, and a memory. The transceiver is coupled with the processor. The memory is configured to store instructions executable by the processor. The processor is configured to load and execute the executable instructions to cause the transceiver to receive first QoS information transmitted by a first entity, or obtain the first QoS information preconfigured, where the first QoS information is used for ensuring requirement or restriction on a first network slice or a first network slice group for a terminal, and the first QoS information includes an SMBR.

According to an aspect of the disclosure, a network device is provided. The network device includes a processor, a transceiver, and a memory. The transceiver is coupled with the processor. The processor is configured to load and execute the executable instructions to cause the transmitter to transmit first QoS information to a second entity, the first QoS information being used for ensuring requirement or restriction on a first network slice or a first network slice group for a terminal, and the first QoS information comprising a slice maximum bitrate (SMBR).

BRIEF DESCRIPTION OF THE DRAWINGS

In order to describe more clearly technical solutions of implementations of the disclosure, the following will give a brief introduction to the accompanying drawings used for describing the implementations. Apparently, the accompanying drawings described below are merely some implementations of the disclosure. Based on these drawings, those of ordinary skill in the art can also obtain other drawings without creative effort.

DETAILED DESCRIPTION

In order to make purposes, technical solutions, and advantages of the disclosure clearer, the following will further elaborate implementations of the disclosure with reference to the accompanying drawings.

Figure 1:
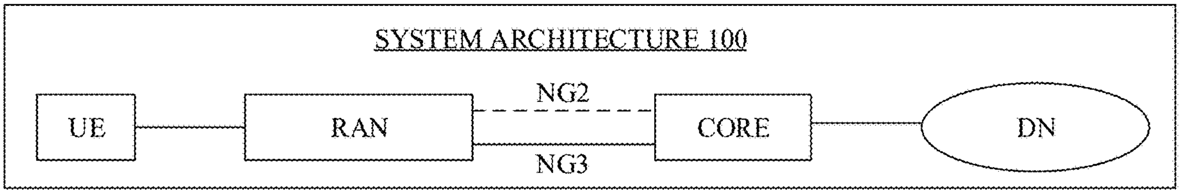
FIG. 1 is a block diagram of a communication system provided in an exemplary implementation of the disclosure.

FIG. 1 is a schematic diagram of a system architecture for a 5$^{th}$ generation system (5GS) provided in implementations of the disclosure. As illustrated in FIG. 1, the system architecture 100 may include a user equipment (UE), a radio access network (RAN), a core network (Core, CN), and a data network (DN). The UE, the RAN, and the Core are major components for constituting the architecture, and they each may logically be divided into a user plane and a control plane, where the control plane is responsible for mobile network management, and the user plane is responsible for service data transmission. In FIG. 1, NG2 reference point is located between a control plane of the RAN and a control plane of the Core, NG3 reference point is located between a user plane of the RAN and a user plane of the Core, and NG6 reference point is located between the user plane of the Core and the data network.

UE: an entrance for interaction between a mobile user and a network. It can provide basic computing capabilities and storage capabilities, display service windows to the user, and receive user operation input. With a next generation (NG) air interface technology, the UE may establish a signal connection and a data connection with the RAN, so that control signals and service data can be transmitted to a mobile network.

RAN: similar to a base station in a conventional network, and it is deployed close to the UE to provide network access functions for authorized users within a specific area, and can transmit user data by using transmission tunnels of different qualities according to user levels and service requirements, etc. The RAN can manage its own resources, utilize the resources properly, provide access services for the UE according to requirements, and forward the control signals and the user data between the UE and the Core.

Core: responsible for maintaining subscription data of a mobile network, managing network elements of the mobile network, and providing functions such as session management, mobility management, policy management, security authentication, etc. for the UE. When the UE is attached, the Core can provide network access authentication for the UE. When the UE has a service request, the Core can allocate network resources to the UE. When the UE moves, the Core can update network resources for the UE. When the UE is idle, the Core can provide a quick recovery mechanism for the UE. When the UE is detached, the Core can release network resources for the UE. When the UE has service data, the Core can provide a data routing function for the UE, for example, forward uplink data to the DN; or receive downlink data of the UE from the DN and then forward the downlink data to the RAN, so as to transmit the downlink data to the UE.

DN: a data network for providing business services for users. Generally, a client is located in the UE, and a server is located in the DN. The DN may be a private network, such as a local area network, or an external network not controlled by operators, such as Internet, or a dedicated network jointly deployed by the operators, for example, for configuring internet protocol (IP) multimedia core network subsystem (IMS) services.

Figure 2:
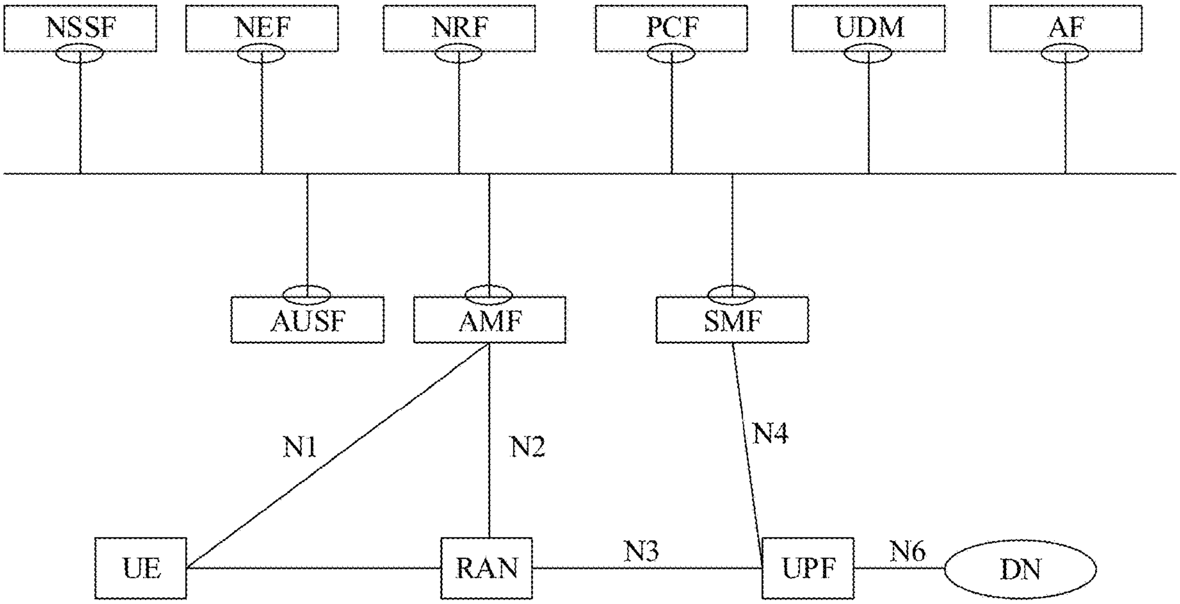
FIG. 2 is a block diagram of a communication system provided in an exemplary implementation of the disclosure.

FIG. 2 illustrates a detailed architecture based on the architecture illustrated in FIG. 1. The user plane of the Core includes a user plane function (UPF). The control plane of the Core includes an authentication server function (AUSF), an access and mobility management function (AMF), a session management function (SMF), a network slice selection function (NSSF), a network exposure function (NEF), a network repository function (NRF), a unified data management (UDM), a policy control function (PCF), and an application function (AF). Functions of these entities are elaborated below.

UPF: user packet forwarding according a routing rule of the SMF.

AUSF: UE security authentication.

AMF: UE access and mobility management.

SMF: UE session management.

NSSF: selecting a network slice for the UE.

NEF: exposing network functions to a third party through a northbound application programming interface (API).

NRF: providing storage functions and selection functions of network function entity information for other network elements.

UDM: user subscription context management.

PCF: user policy management.

AF: user application function management.

In the architecture illustrated in FIG. 2, N1 interface is a reference point between the UE and the AMF. N2 interface is a reference point between the RAN and the AMF, and is used for non-access stratum (NAS) message transmission, etc. N3 interface is a reference point between the RAN and the UPF, and is used for transmission of user plane data, etc. N4 interface is a reference point between the SMF and the UPF, and is used for transmission of, for example, a tunnel identifier, data-buffering indication information, and a downlink-data notification message, etc. of an N3 connection. N6 interface is a reference point between the UPF and the DN, and is used for transmission of user plane data, etc. NG interface is an interface between the RAN and the 5G Core.

It is to be noted that, the names of interfaces between various network elements in FIG. 1 and FIG. 2 are merely an example, and the interfaces may also be in other names in actual implementations, and implementations of the disclosure are not limited in this regard. The names of the network elements (such as SMF, AF, UPF, etc.) in FIG. 1 and FIG. 2 are also merely an example, and does not constitute limitation on the functions of the network elements. In a 5GS and other future networks, the above network elements may also be in other names, and implementations of the disclosure are not limited in this regard. For example, in a $6^{th}$ generation (6G) network, some or all of the above network elements may use the terms in 5G, or may use other names, etc., which is collectively explained herein and will not be repeated below. In addition, it is to be understood that, the names of messages (or signaling) transmitted between the above network elements are merely an example, and do not constitute any limitation on the functions of the messages.

Implementations of the disclosure provide a method for quality of service (QoS) information transmission, a method for QoS information reception, an apparatus, a device, and a medium, which can provide enhanced network slicing service with aid of QoS information.

Figure 3:
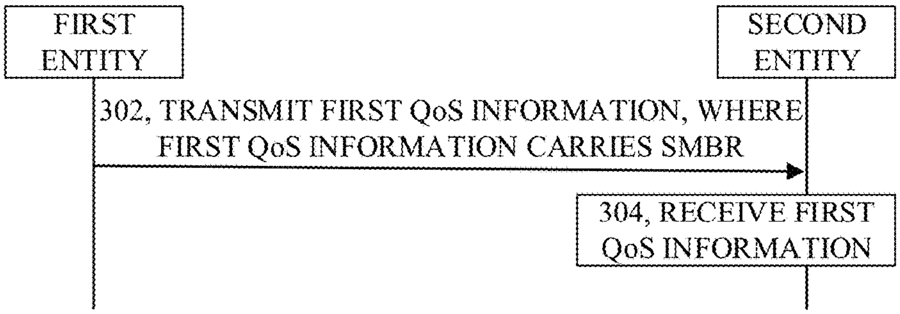
FIG. 3 is a flowchart of a method for quality of service (QoS) information transmission provided in an exemplary implementation of the disclosure.

FIG. 3 is a flowchart of a method for quality of service (QoS) information transmission provided in an exemplary implementation of the disclosure. In the implementation, the method is exemplarily applicable to a first entity and a second entity. The method includes the following.

Step 302, the first entity transmits first QoS information to the second entity, where the first QoS information is used for ensuring requirement or restriction on a first network slice or a first network slice group for a terminal.

The first network slice includes all network slices for the terminal or a specific network slice (or some intended network slices) for the terminal. The first network slice group includes all network slice groups for the terminal or a specific network slice group (or some intended network slice groups) for the terminal.

In an example, the first QoS information includes a slice maximum bitrate (SMBR). Optionally, the first QoS information further includes at least one of a slice identifier or an uplink-downlink direction.

In another example, the first QoS information includes at least one of an SMBR, a slice identifier, or an uplink-downlink direction.

The slice identifier may be indicated by a single-network slice selection assistance information (S-NSSAI), or may be indicated by a slice identity (ID). The slice identifier is used for indicating a specific network slice or a specific network slice group. The uplink-downlink direction is used for indicating an uplink direction, a downlink direction, or an uplink and downlink direction.

Step 304, the second entity receives the first QoS information transmitted by the first entity.

The first entity includes at least one of a first AMF or a first base station. Exemplarily, the first base station includes at least one of a master node (MN), a secondary node (SN), an anchor base station (last serving gNB or anchor gNB), or a source base station.

The second entity includes at least one of a second AMF or a second base station. Exemplarily, the second base station includes at least one of an SN, an MN, a current base station (serving gNB), or a target base station, where the current base station is a gNB for requesting a UE context.

As can be seen, according to the method provided in the implementation, the first entity transmits the SMBR to the second entity, such that a network device can ensure or restrict a bit rate(s) of all the network slices or an intended network slice(s) for the terminal, thereby providing enhanced network slicing service.

In the optional implementation based on FIG. 3, in an applicable scenario, the first entity transmits the first QoS information to the second entity, and the second entity receives the first QoS information transmitted by the first entity. The applicable scenario includes at least one of: bearer splitting, handover, context setup, context modification, context retrieval, protocol data unit (PDU) session establishment, PDU session modification, service request, SN addition, SN modification, or next-generation (NG) setup.

Figure 4:
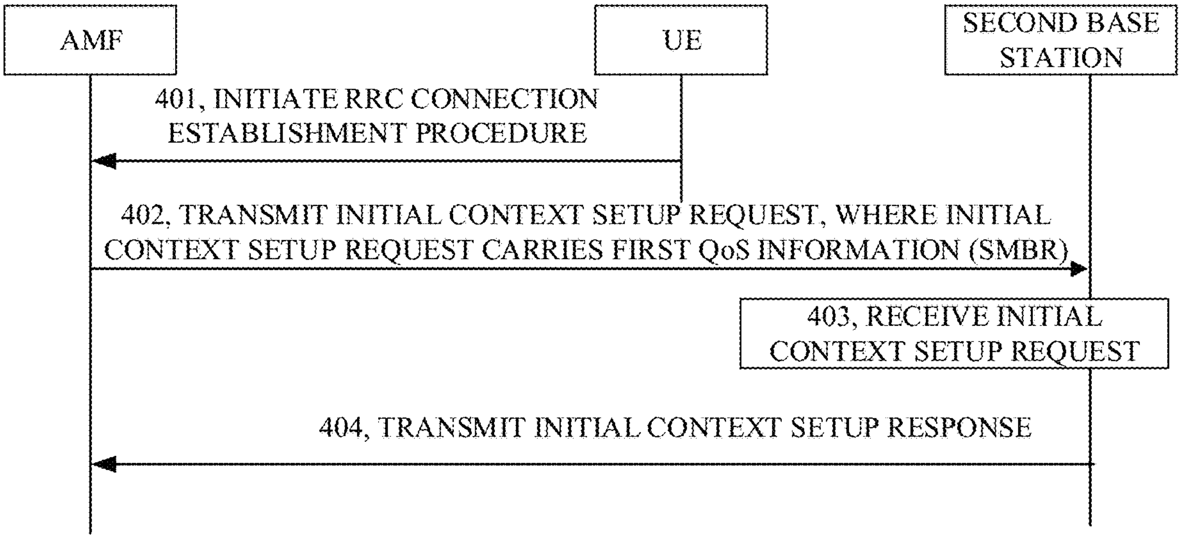
FIG. 4 is a flowchart of a method for QoS information transmission provided in an exemplary implementation of the disclosure.

For the case where the applicable scenario includes context setup, FIG. 4 is a flowchart of a method for QoS information transmission provided in another exemplary implementation of the disclosure. In the implementation, the method is exemplarily applicable to an AMF and the second base station. The method includes the following.

Step 401, a UE initiates a radio resource control (RRC) connection establishment procedure to the first AMF.

RRC is a radio connection between the UE and the second base station.

Step 402, the first AMF transmits an initial context setup request to the second base station, where the initial context setup request carries the first QoS information.

The first QoS information is used for ensuring requirement or restriction on the first network slice or the first network slice group for the terminal. The first QoS information is a part of a UE context, and is used for a RAN-side to ensure requirement or restriction on the first network slice or the first network slice group for the UE, or used for the RAN-side to implement at least one of service policy, service scheduling, resource allocation, or service adjustment.

The first network slice includes all network slices for the terminal or a specific network slice (or some intended network slices) for the terminal. The first network slice group includes all network slice groups for the terminal or a specific network slice group (or some intended network slice groups) for the terminal.

In an example, the first QoS information includes an SMBR. Optionally, the first QoS information further includes at least one of a slice identifier or an uplink-downlink direction.

In another example, the first QoS information includes at least one of an SMBR, a slice identifier, or an uplink-downlink direction.

In the implementation, the first QoS information is optional in the UE context, or the first QoS information is present when there is a PDU session establishment corresponding to the SMBR, or the first QoS information is present when there is a PDU session resource setup.

Step 403, the second base station receives the initial context setup request transmitted by the first AMF.

The second base station saves the first QoS information in the UE context. The first QoS information is used for the RAN-side to implement at least one of service policy, service scheduling, resource allocation, or service adjustment.

Step 404, the second base station transmits an initial context setup response to the first AMF.

As can be seen, according to the method provided in the implementation, the first AMF transmits the SMBR to the second base station during initial UE-context setup, such that a network device can ensure or restrict a bit rate(s) of all the network slices or an intended network slice(s) for the terminal, thereby providing enhanced network slicing service.

In the optional implementation based on FIG. 4, for the case where the applicable scenario includes context modification or context update, the first AMF transmits a UE context modification request to the second base station, where the UE context modification request carries the first QoS information, such that the AMF notifies to the second base station a UE context containing the first QoS information.

In the optional implementation based on FIG. 4, for the case where the applicable scenario includes downlink NAS transport, the first AMF transmits a UE context modification request or a downlink NAS transport message to the second base station, where the UE context modification request or the downlink NAS transport message carries the first QoS information, such that the AMF notifies to the second base station a UE context containing the first QoS information.

Figure 5:
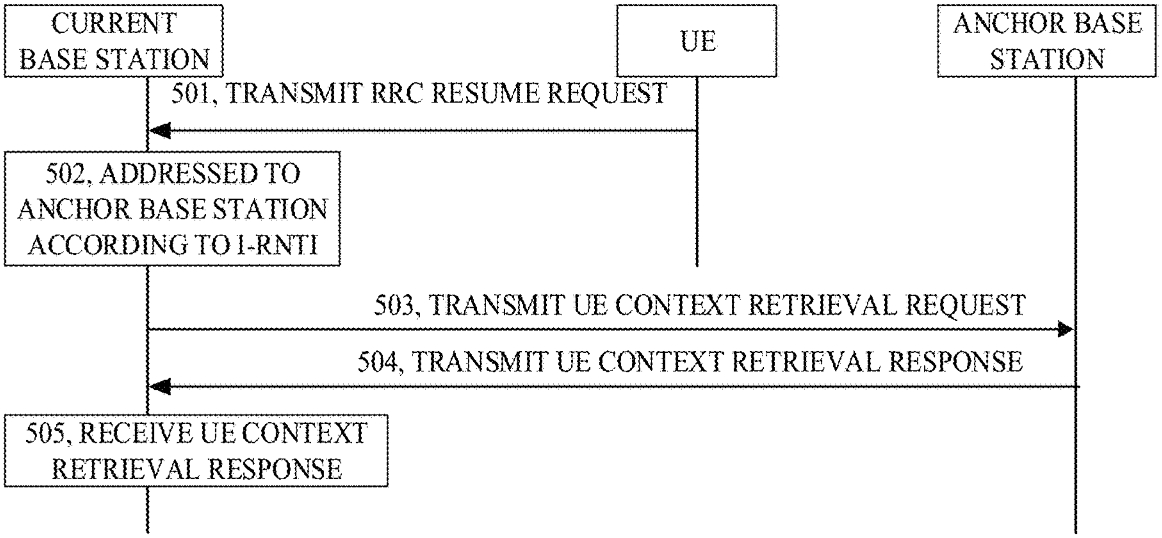
FIG. 5 is a flowchart of a method for QoS information transmission provided in an exemplary implementation of the disclosure.

For a context retrieval scenario, FIG. 5 is a flowchart of a method for QoS information transmission provided in another exemplary implementation of the disclosure. In the implementation, the method is exemplarily applicable to the current base station and the anchor base station. The method includes the following.

Step 501, a UE transmits an RRC resume request (or RRC resume request 1) to the current base station.

The RRC resume request or RRC resume request 1 contains an inactive-radio network temporary identity (I-RNTI) for the UE, where the I-RNTI is a UE ID that is allocated to the UE by the anchor base station (last serving gNB).

Step 502, the current base station is addressed to the anchor base station according to the I-RNTI.

Step 503, the current base station transmits a UE context retrieval request to the anchor base station.

Step 504, the anchor base station transmits a UE context retrieval response to the current base station, where the UE context retrieval response carries the first QoS information.

The first QoS information is used for ensuring requirement or restriction on the first network slice or the first network slice group for the terminal. The first QoS information can be a part of a UE context, and is used for a RAN-side to ensure requirement or restriction on the first network slice or the first network slice group for the UE, or used for the RAN-side to implement at least one of service policy, service scheduling, resource allocation, or service adjustment, or used for requiring the current base station to prepare a corresponding resource.

The first network slice includes all network slices for the terminal or a specific network slice (or some intended network slices) for the terminal. The first network slice group includes all network slice groups for the terminal or a specific network slice group (or some intended network slice groups) for the terminal.

In an example, the first QoS information includes an SMBR. Optionally, the first QoS information further includes at least one of a slice identifier or an uplink-downlink direction.

In another example, the first QoS information includes at least one of an SMBR, a slice identifier, or an uplink-downlink direction.

Step 505, the current base station receives the UE context retrieval response transmitted by the anchor base station.

After the current base station has received the UE context retrieval response, the current base station saves the UE context, and completes RRC connection resume with the UE.

As can be seen, according to the method provided in the implementation, the anchor base station saves the UE context for the current base station during UE context retrieval, where the first QoS information in the UE context includes the SMBR. As such, after obtaining the UE context, the current base station can subsequently implement at least one of service policy, service scheduling, resource allocation, or service adjustment according to the first QoS information, thereby providing enhanced network slicing service for the UE.

Figure 6:
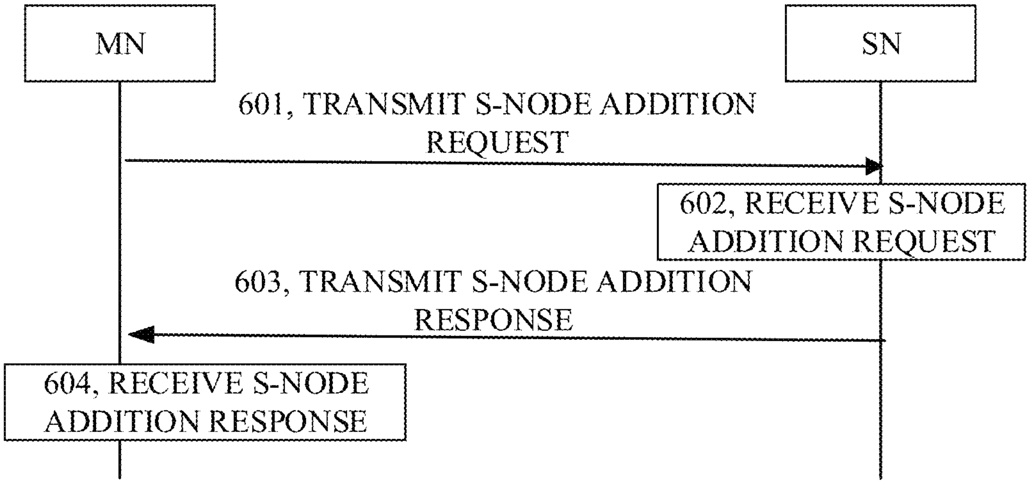
FIG. 6 is a flowchart of a method for QoS information transmission provided in an exemplary implementation of the disclosure.

For an SN addition/SN modification scenario, FIG. 6 is a flowchart of a method for QoS information transmission provided in another exemplary implementation of the disclosure. In the implementation, the method is exemplarily applicable to an MN and an SN. The method includes the following.

Step 601, the MN transmits an S-node addition request to the SN, where the S-node addition request carries the first QoS information.

In a dual-connectivity (DC) scenario, the MN transmits the S-node addition request to the SN, to require the SN to prepare a corresponding resource.

The first QoS information is used for ensuring requirement or restriction on the first network slice or the first network slice group for the terminal. The first QoS information is a part of a UE context, and is used for a RAN-side to ensure requirement or restriction on the first network slice or the first network slice group for the UE, or used for the RAN-side to implement at least one of service policy, service scheduling, resource allocation, or service adjustment, or used for requiring the current base station to prepare a corresponding resource.

The first network slice includes all network slices for the terminal or a specific network slice (or some intended network slices) for the terminal. The first network slice group includes all network slice groups for the terminal or a specific network slice group (or some intended network slice groups) for the terminal.

In an example, the first QoS information includes an SMBR. Optionally, the first QoS information further includes at least one of a slice identifier or an uplink-downlink direction.

In another example, the first QoS information includes at least one of an SMBR, a slice identifier, or an uplink-downlink direction.

Step 602, the SN receives the S-node addition request transmitted by the MN.

In an example, the SN uses and saves the first QoS information transmitted by the MN, for example, for ensuring requirement or restriction on the first network slice or the first network slice group for the UE, or for implementing at least one of service policy, service scheduling, resource allocation, or service adjustment.

In another example, the SN evaluates and/or modifies the first QoS information. After modifying the first QoS information, the SN transmits a handover request acknowledge to the MN, where the handover request acknowledge contains the first QoS information that needs to be modified or negotiated. After receiving the handover request acknowledge, the MN accepts the modified first QoS information, or once again requests modification.

Step 603, the SN transmits an S-node addition response to the MN.

Step 604, the MN receives the S-node addition response transmitted by the SN.

In another design of the implementation, the SN may transmit the first QoS information to the MN, where the first QoS information is carried in the S-node addition response.

In another design of the implementation, for an SN modification scenario, the "S-node addition request" above will be replaced by an "S-node modification request", the "S-node addition response" above will be replaced by an "S-node modification response", and other interaction procedures are similar to those in step 601 to step 604 and will not be elaborated again herein.

As can be seen, according to the method provided in the implementation, during SN addition/SN modification in a DC scenario, the SMBR is transferred to the SN by the MN or transferred to the MN by the SN, and the SN uses the SMBR to perform subsequent operations, such that a RAN can provide enhanced network slicing service for the UE.

Figure 7:
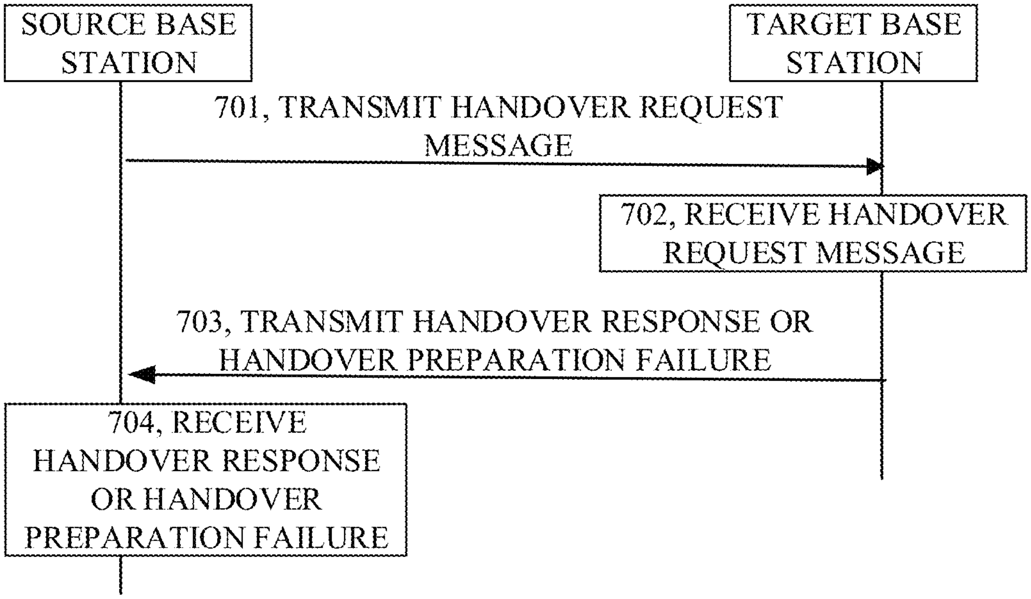
FIG. 7 is a flowchart of a method for QoS information transmission provided in an exemplary implementation of the disclosure.

For a handover (HO) scenario, FIG. 7 is a flowchart of a method for QoS information transmission provided in another exemplary implementation of the disclosure. In the implementation, the method is exemplarily applicable to a source base station and a target base station during handover. The method includes the following.

Step 701, the source base station transmits a handover request message to the target base station or a target AMF, where the handover request message carries the first QoS information.

In HO, there are two scenarios, that is, an Hn HO scenario and an N2 HO scenario. In the Hn HO scenario, the source base station transmits the handover request message to the target base station, where the handover request message carries the first QoS information.

The first QoS information is used for ensuring requirement or restriction on the first network slice or the first network slice group for the terminal. The first QoS information is a part of a UE context, and is used for a RAN-side to ensure requirement or restriction on the first network slice or the first network slice group for the UE, or used for the RAN-side to implement at least one of service policy, service scheduling, resource allocation, or service adjustment, or used for requiring the current base station to prepare a corresponding resource.

The first network slice includes all network slices for the terminal or a specific network slice (or some intended network slices) for the terminal. The first network slice group includes all network slice groups for the terminal or a specific network slice group (or some intended network slice groups) for the terminal.

In an example, the first QoS information includes an SMBR. Optionally, the first QoS information further includes at least one of a slice identifier or an uplink-downlink direction.

In another example, the first QoS information includes at least one of an SMBR, a slice identifier, or an uplink-downlink direction.

Step 702, the target base station receives the handover request message.

Step 703, the target base station transmits a handover response or a handover preparation failure to the source base station.

Step 704, the source base station receives the handover response or the handover preparation failure transmitted by the target base station.

In a scenario of transmitting the handover response, the target base station saves the first QoS information.

Optionally, the target base station may reject or modify the first QoS information. After rejecting or modifying the first QoS information, the target base station transmits a response message or a failure message to a network entity that has triggered handover, where the response message or the failure message carries the first QoS information that needs to be rejected or modified or negotiated.

In another optional design of the implementation, in the N2 HO scenario, the source base station transmits the handover request message to the target AMF (that is, the second AMF), where the handover request message carries the first QoS information, and the first QoS information is optional.

In another optional design of the implementation, in the N2 HO scenario, after receiving the handover request message transmitted by the source base station, the first AMF transmits the handover request message to the target base station, where the handover request message carries the first QoS information, and the first QoS information is mandatory.

Optionally, in another optional design of the implementation, in the N2 HO scenario, the target base station may reject or modify the first QoS information. After rejecting or modifying the first QoS information, the target base station transmits a response message or a failure message to a network entity that has triggered handover, where the response message or the failure message carries the first QoS information that needs to be rejected or modified or negotiated.

As can be seen, according to the method provided in the implementation, in the handover scenario, the AMF or the source base station transmits the SMBR to the target base station, such that the target base station can ensure requirement or restriction on the first network slice or the first network slice group for the UE, or the RAN-side implements service policy, scheduling, resource allocation, or adjustment to ensure requirement on a slice for the UE.

Figure 8:
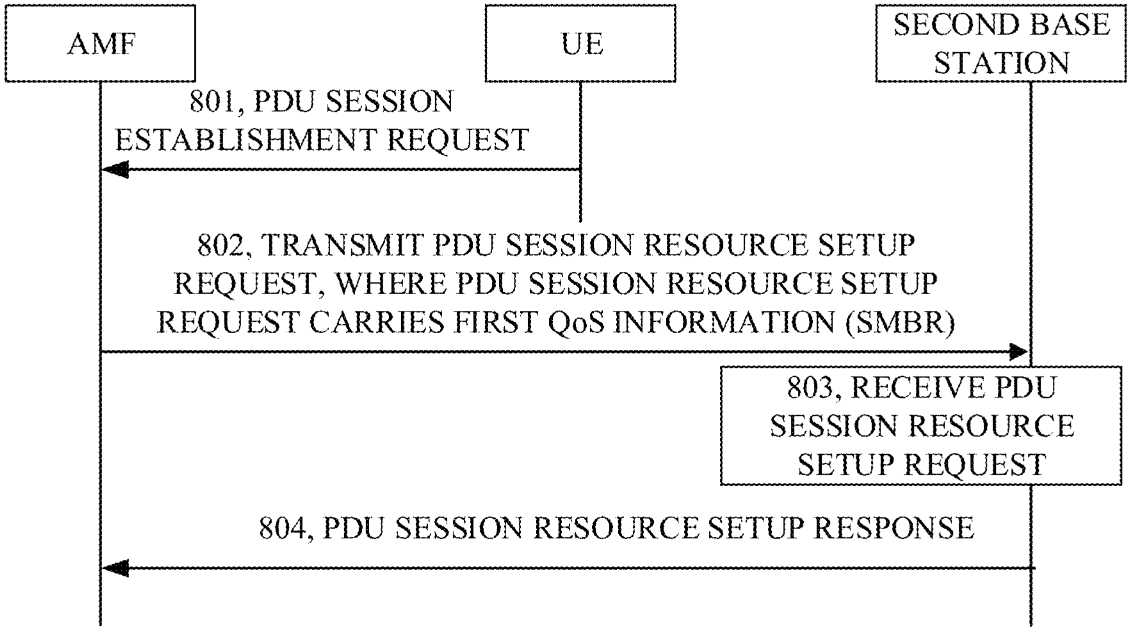
FIG. 8 is a flowchart of a method for QoS information transmission provided in an exemplary implementation of the disclosure.

For a PDU session establishment/PDU session modification/service request/NG interface setup scenario, FIG. 8 is a flowchart of a method for QoS information transmission provided in another exemplary implementation of the disclosure. In the implementation, the method is exemplarily applicable to the first AMF and the second base station during handover. The method includes the following.

Step 801, a UE transmits a PDU session establishment request to the first AMF.

Step 802, the first AMF transmits a PDU session resource setup request to the second base station, where the PDU session resource setup request carries the first QoS information.

The PDU session resource setup request is also referred to as an N2 PDU session request.

The first QoS information is used for ensuring requirement or restriction on the first network slice or the first network slice group for the terminal. The first QoS information is a part of a UE context, and is used for a RAN-side to ensure requirement or restriction on the first network slice or the first network slice group for the UE, or used for the RAN-side to implement at least one of service policy, service scheduling, resource allocation, or service adjustment, or used for requiring the current base station to prepare a corresponding resource.

The first network slice includes all network slices for the terminal or a specific network slice (or some intended network slices) for the terminal. The first network slice group includes all network slice groups for the terminal or a specific network slice group (or some intended network slice groups) for the terminal.

In an example, the first QoS information includes an SMBR. Optionally, the first QoS information further includes at least one of a slice identifier or an uplink-downlink direction.

In another example, the first QoS information includes at least one of an SMBR, a slice identifier, or an uplink-downlink direction.

Step 803, the second base station receives the PDU session resource setup request.

Step 804, the second base station transmits a PDU session resource setup response to the first AMF.

Specifically, for a network slice, if a PDU session or QoS flow that has been setup and a PDU session or QoS flow requested to be setup exceed an SMBR requirement, at least one of the following operations will be performed.

i. The second base station rejects the PDU session or QoS flow requested to be setup, and the PDU session or QoS flow requested to be setup will be included in a PDU session or QoS flow that failed to be setup and/or the second base station gives a reason for unsuccessful setup.

i i. The second base station determines, according to an allocation and retention priority (ARP) and the SMBR, whether to reject the PDU session or QoS flow requested be setup. If the PDU session or QoS flow requested to be setup has a higher priority or is capable of pre-empting other PDU sessions or QoS flows, the second base station establishes the PDU session or QoS flow that is requested, so as to pre-empt a PDU session or QoS flow that has been setup.

If the PDU session has been successfully received, the second base station transmits a PDU session resource setup response transfer information element (IE), where the IE contains a QoS flow that has been successfully setup and a QoS flow that failed to be setup (including the reason for the unsuccessful setup).

If the PDU session failed to be received, the second base station transmits a PDU session resource setup unsuccessful transfer IE, where the IE contains a PDU session that failed to be setup and the reason for the unsuccessful setup.

Transmission of the first QoS information during PDU session establishment has been illustrated in step 801 to step 803 above. In an optional design of the implementation, for a PDU session modification scenario, the first AMF carries the first QoS information in a PDU session resource modify request message transmitted to the second base station. Optionally, the second base station determines, according to the ARP and/or the first QoS information, whether to set up/modify the PDU session or QoS flow.

In an optional design of the implementation, for a service request scenario, the first AMF carries the first QoS information in an N2 request message transmitted to the second base station. Optionally, the second base station determines, according to the ARP and/or the first QoS information, whether to establish/modify the PDU session or QoS flow.

In an optional design of the implementation, for an NG interface setup scenario, the AMF transmits an NG interface setup response to the second base station, where the NG interface setup response carries the first QoS information. Optionally, the second base station saves the first QoS information.

As can be seen, according to the method provided in the implementation, the AMF provides the SMBR to the second base station during a procedure related to PDU session, and the second base station determines setup, modification, etc. of a PDU session or QoS flow based on the SMBR to implement scheduling and resource allocation, thereby ensuring requirement/restriction on the first network slice or the first network slice group for the UE.

In another implementation of the disclosure, the first QoS information is pre-configured for the second entity, for example, the first QoS information is pre-configured for the second base station. For instance, the first QoS information is pre-configured for the second entity with aid of an operation administration and maintenance (OAM).

Exemplarily, the format of the initial context setup request is as follows.

Initial context setup request:

Usage: This message is transmitted by an AMF to request setup of a UE context.

Direction: AMF→NG-RAN node.

The IE/group name of the initial context setup request includes at least one of message type, AMF UE NG application protocol (NGAP) ID, RAN UE NGAP ID, old AMF, UE aggregate maximum bit rate, core network assistance information for RRC inactive, globally unique AMF identifier (GUAMI), PDU session resource setup request list, PDU session resource setup request item, >>PDU session ID, >>PDU session NAS-PDU, >>S-NSSAI, >>PDU session resource setup request transfer, allowed NSSAI, UE security capabilities, security key, trace activation, mobility restriction list, UE radio capability, index to radio access technology (RAT)/frequency selection priority, masked international mobile station equipment identity and software version number (IMEISV), NAS-PDU, emergency fallback indicator, RRC inactive transition report request, UE radio capability for paging, redirection for voice evolved packet system (EPS) fallback, location reporting request type, CN assisted RAN parameters tuning, single radio voice call continuity (SRVCC) operation possible, integrated access and backhaul (IAB) authorized, enhanced coverage restriction, extended connected time, UE differentiation information, new radio (NR) vehicle to everything (V2X) services authorized, long-term evolution (LTE) V2X services authorized, NR UE sidelink aggregate maximum bit rate, LTE UE sidelink aggregate maximum bit rate, proximity-based service (ProSe) communication (interface) 5 (PC5) QoS parameters, coverage enhancement (CE)-mode-B restricted, UE user plane consumer internet of things (CIoT) support indicator, residential gateway (RG) level wireline access characteristics, management based minimization of drive test (MDT) public land mobile network (PLMN) list, or UE radio capability ID. Besides, the following four group names are added:

TABLE 1

| IE/group name | Mandatory/ Optional (M/O) | Range | IE type and reference | Semantics description | Criticality | Assigned criticality |
|---|---|---|---|---|---|---|
| SMBR list | | 0.1 | | | YES | reject |
| >SMBR item | | 1..<maxnoofSliceItems> | | | — | |
| >>S-NSSAI | M | | | | | |
| >>SMBR | M | | | | | |

Exemplarily, the format of UE context information—retrieve UE context response is as follows.

Usage: This IE contains UE context information.

The IE/group name of the UE context information—retrieve UE context response includes at least one of NG-C UE associated signaling reference, signaling transport network layer (TNL) association address at source NG-C side, UE security capabilities, AS security information, UE aggregate maximum bit rate, PDU session resources to be setup list, RRC context, mobility restriction list, or index to RAT/frequency selection priority. Besides, SMBR list, >SMBR item, >>S-NSSAI, and >>SMBR shown in table 1 are also included.

Exemplarily, the format of the S-node addition request is as follows.

This message is transmitted by an M-NG-RAN node to an S-NG-RAN node to request preparation of resources for dual connectivity operation for a specific UE.

Direction: M-NG-RAN node→S-NG-RAN node.

The IE/group name of the S-node addition request includes at least one of message type, M-NG-RAN node UE XnAP ID, UE security capabilities, S-NG-RAN node security key, S-NG-RAN node UE aggregate maximum bit rate, selected PLMN, mobility restriction list, index to RAT/frequency selection priority, PDU session resources to be added list, >PDU session resources to be added item, >>PDU session ID, >>S-NSSAI, >>S-NG-RAN node PDU session aggregate maximum bit rate, >>PDU session resource setup info–SN terminated, >>PDU session resource setup info–MN terminated, M-NG-RAN node to S-NG-RAN node container, S-NG-RAN node UE XnAP ID, expected UE behaviour, requested split signaling radio bearers (SRB), primary cell (PCell) ID, desired activity notification level, available data radio bearer (DRB) IDs, or S-NG-RAN node maximum integrity protected data rate. Besides, SMBR list, >SMBR item, >>S-NSSAI, >>SMBR shown in table 1 are also included.

Exemplarily, the format of the handover request message is as follows.

This message is transmitted by a source NG-RAN node (base station) to a target NG-RAN node to request preparation of resources for a handover.

Direction: source NG-RAN node→target NG-RAN node.

The IE/group name of the handover request message includes at least one of message type, source NG-RAN node UE XnAP ID reference, cause, target cell global ID, GUAMI, UE context information, >NG-C UE associated signalling reference, >signalling TNL association address at source NG-C side, >UE security capabilities, >AS security information, >index to RAT/frequency selection priority, >UE aggregate maximum bit rate, >PDU session resources to be setup list, >RRC context, >location reporting information, >mobility restriction list, trace activation, masked IMEISV, UE history information, UE context reference at the S-NG-RAN node, >global NG-RAN node ID, or >S-NG-RAN node UE XnAP ID. Besides, SMBR list, >SMBR item, >>S-NSSAI, >>SMBR shown in table 1 are also included.

Exemplarily, the format of the PDU session resource setup request is as follows.

This message is transmitted by an AMF and is used to request an NG-RAN node to assign resources on UE-universal mobile telecommunication system (UMTS) terrestrial radio access network (UE-UTRAN, Uu) and NG-U for one or several PDU session resources.

Direction: AMF→NG-RAN node.

The IE/group name of the PDU session resource setup request includes at least one of message type, AMF UE NGAP ID, RAN UE NGAP ID, RAN paging priority, NAS-PDU, PDU session resource setup request list, >PDU session resource setup request item, >>PDU session ID, >>PDU session NAS-PDU, >>S-NSSAI, >>PDU session resource setup request transfer, or UE aggregate maximum bit rate. Besides, SMBR list, >SMBR item, >>S-NSSAI, >>SMBR shown in table 1 are also included.

The NGAP above refers to NG application protocol.

Figure 9:
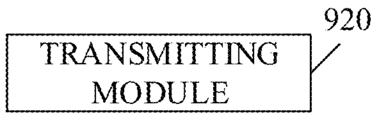
FIG. 9 is a block diagram of an apparatus for QoS information transmission provided in an exemplary implementation of the disclosure.

FIG. 9 is a block diagram of an apparatus for QoS information transmission provided in an exemplary implementation of the disclosure. The apparatus includes a transmitting module 920. The transmitting module 920 is configured to transmit first QoS information to a second entity, where the first QoS information is used for ensuring requirement or restriction on a first network slice or a first network slice group for a terminal, and the first QoS information includes an SMBR.

In an optional design of the implementation, the first QoS information further includes at least one of a slice identifier or an uplink-downlink direction.

In an optional design of the implementation, the apparatus includes at least one of a first AMF or a first base station.

In an optional design of the implementation, the first base station includes at least one of: an MN, an SN, or an anchor base station.

In an optional design of the implementation, the second entity includes at least one of a second AMF or a second base station.

In an optional design of the implementation, the second base station includes at least one of: an SN, an MN, or a current base station.

In an optional design of the implementation, the transmitting module 920 is configured for a first entity to transmit the first QoS information to the second entity in an applicable scenario, where the applicable scenario includes at least one of: bearer splitting, handover, context setup, context modification, context retrieval, PDU session establishment, PDU session modification, service request, SN addition, SN modification, or NG interface setup.

In an optional design of the implementation, the applicable scenario includes context setup or service request, and the transmitting module 920 is configured to transmit an initial context setup request to the second base station, where the initial context setup request carries the first QoS information.

In an optional design of the implementation, the first QoS information is present when there is a PDU session establishment corresponding to the SMBR, or the first QoS information is present when there is a PDU session resource setup.

In an optional design of the implementation, the applicable scenario includes context modification or downlink NAS transport, and the transmitting module 920 is configured to transmit a UE context modification request to the second base station, where the UE context modification request carries the first QoS information; or the transmitting module 920 is configured to transmit a downlink NAS transport message to the second base station, where the downlink NAS transport message includes the first QoS information.

In an optional design of the implementation, the applicable scenario includes context retrieval, and the transmitting module 920 is configured to transmit a UE context retrieval response to the current base station, where the UE context retrieval response carries the first QoS information.

In an optional design of the implementation, the applicable scenario includes SN addition or SN modification, and the transmitting module 920 is configured to transmit an S-node addition request to the SN, where the S-node addition request carries the first QoS information; or the transmitting module 920 is configured to transmit an S-node addition response to the MN, where the S-node addition response carries the first QoS information; or the transmitting module 920 is configured to transmit an S-node modification request to the SN, where the S-node modification request carries the first QoS information; or the transmitting module 920 is configured to transmit an S-node modification response to the MN, where the S-node modification response carries the first QoS information.

In an optional design of the implementation, the applicable scenario includes handover, and the transmitting module 920 is configured to transmit a handover request message to a target base station, where the handover request message carries the first QoS information.

In an optional design of the implementation, the applicable scenario includes PDU session establishment or PDU modification, and the transmitting module 920 is configured to transmit a PDU session resource setup request to the second base station, where the PDU session resource setup request carries the first QoS information; or transmit a PDU session resource modify request to the second base station, where the PDU session resource modify request carries the first QoS information.

In an optional design of the implementation, the applicable scenario includes NG interface setup, and the transmitting module 920 is configured to transmit an NG interface setup response to the second base station, where the NG interface setup response carries the first QoS information.

Figure 10:
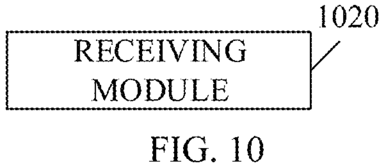
FIG. 10 is a block diagram of an apparatus for QoS information reception provided in an exemplary implementation of the disclosure.

FIG. 10 is a block diagram of an apparatus for QoS information reception provided in an exemplary implementation of the disclosure. The apparatus includes a receiving module 1020. The receiving module 1020 is configured to receive first QoS information transmitted by a first entity, or configured for a second entity to obtain the first QoS information pre-configured, where the first QoS information is used for ensuring requirement or restriction on a first network slice or a first network slice group for a terminal, and the first QoS information includes an SMBR.

In an optional design of the implementation, the first QoS information further includes at least one of a slice identifier or an uplink-downlink direction.

In an optional design of the implementation, the first entity includes at least one of a first AMF or a first base station.

In an optional design of the implementation, the first base station includes at least one of: an MN, an SN, or an anchor base station.

In an optional design of the implementation, the second entity includes at least one of a second AMF or a second base station.

In an optional design of the implementation, the second base station includes at least one of: an SN, an MN, or a current base station.

In an optional design of the implementation, the second entity receives the first QoS information transmitted by the first entity as follows. The second entity receives the first QoS information transmitted by the first entity in an applicable scenario, where the applicable scenario includes at least one of: bearer splitting, handover, context setup, context modification, context retrieval, PDU session establishment, PDU session modification, service request, SN addition, SN modification, or NG setup.

In an optional design of the implementation, the applicable scenario includes context setup or service request, and the receiving module 1020 is configured to receive an initial context setup request transmitted by the first AMF, where the initial context setup request carries the first QoS information.

In an optional design of the implementation, the first QoS information is present when there is a PDU session establishment corresponding to the SMBR, or the first QoS information is present when there is a PDU session resource setup.

In an optional design of the implementation, the applicable scenario includes context modification or downlink NAS transport, and the receiving module 1020 is configured to receive a UE context modification request transmitted by the first AMF, where the UE context modification request carries the first QoS information; or the receiving module 1020 is configured to receive a downlink NAS transport message transmitted by the first AMF, where the downlink NAS transport message carries the first QoS information.

In an optional design of the implementation, the applicable scenario includes context retrieval, and the receiving module 1020 is configured to receive a UE context retrieval response transmitted by the anchor base station, where the UE context retrieval response carries the first QoS information.

In an optional design of the implementation, the applicable scenario includes SN addition or SN modification, and the receiving module 1020 is configured to receive an S-node addition request transmitted by the MN, where the S-node addition request carries the first QoS information; or the receiving module 1020 is configured to receive an S-node addition response transmitted by the SN, where the S-node addition response carries the first QoS information; or the receiving module 1020 is configured to receive an S-node modification request transmitted by the MN, where the S-node modification request carries the first QoS information; or the receiving module 1020 is configured to receive an S-node modification response transmitted by the SN, where the S-node modification response carries the first QoS information.

In an optional design of the implementation, the applicable scenario includes handover, and the receiving module 1020 is configured to receive a handover request message transmitted by the first AMF, where the handover request message carries the first QoS information; or receive the handover request message transmitted by the source base station, where the handover request message carries the first QoS information.

In an optional design of the implementation, the applicable scenario includes PDU session establishment or PDU modification, and the receiving module 1020 is configured to receive a PDU session resource setup request transmitted by the first AMF, where the PDU session resource setup request carries the first QoS information; or receive a PDU session resource modification request transmitted by the first AMF, where the PDU session resource modification request carries the first QoS information.

In an optional design of the implementation, the applicable scenario includes NG interface setup, and the receiving module 1020 is configured to receive an NG interface setup response transmitted by the first AMF, where the NG interface setup response carries the first QoS information.

Figure 11:
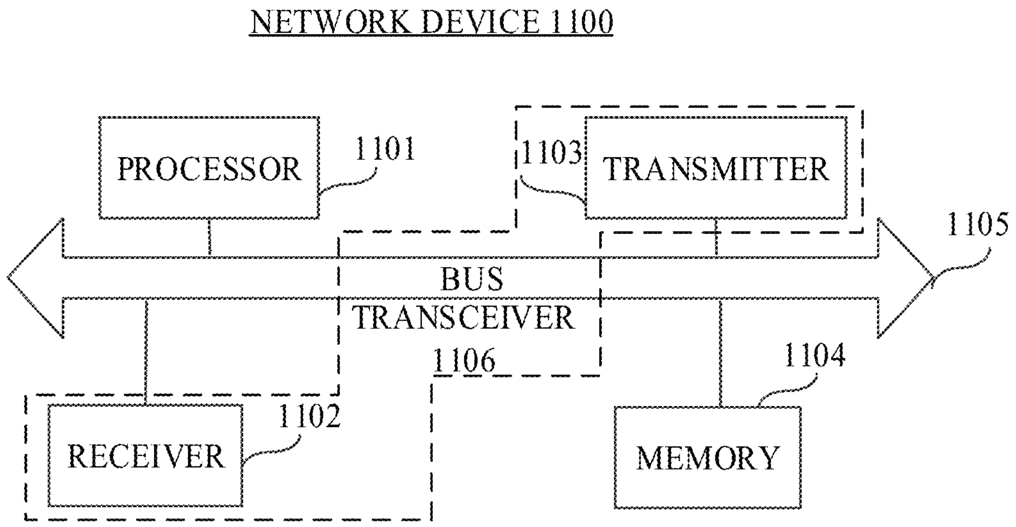
FIG. 11 is a block diagram of a communication device provided in an exemplary implementation of the disclosure.

FIG. 11 is a schematic structural diagram of a network device 1100 provided in an implementation of the disclosure. For example, the network device may be configured to execute the method for QoS information transmission or the method for QoS information reception at a network-device side. Specifically, the network device 1100 may include a processor 1101, a receiver 1102, a transmitter 1103, a memory 1104, and a bus 1105.

The processor 1101 includes one or more processing cores, and the processor 1101 executes various function applications and information processing by running software programs and modules.

The receiver 1102 and the transmitter 1103 may be implemented as a transceiver 1106, where the transceiver 1106 may be a communication chip.

The memory 1104 is coupled with the processor 1101 through a bus 1105.

The memory 1104 may be configured to store computer programs. The processor 1101 is configured to execute the computer programs to implement various steps executed by the network device in the foregoing method implementations.

In addition, the memory 1104 may be implemented by any type of volatile or nonvolatile storage device or combination thereof. The volatile or non-volatile storage device includes, but is not limited to, a random access memory (RAM), a read-only memory (ROM), an erasable programmable read-only memory (EPROM), an electrically erasable programmable read-only memory (EEPROM), a flash memory or other solid state storage devices, a compact disc ROM (CD-ROM), a digital video disc (DVD) or other optical storage, magnetic cassettes, magnetic tape, magnetic disk storage or other magnetic storage devices.

In an exemplary implementation, a computer-readable storage medium is further provided. The computer-readable storage medium is configured to store at least one instruction, at least one program, a code set, or an instruction set which is loaded and executed by a processor to implement the method for QoS information transmission that is executed by a terminal or a network device and provided in the foregoing method implementations.

In an exemplary implementation, a computer program product or computer program is further provided. The computer program product or computer program includes computer instructions which are stored in a computer-readable storage medium. A processor of a communication device reads the computer instructions from the computer-readable storage medium and executes the computer instructions, such that the communication device executes the foregoing method for QoS information transmission.

Those of ordinary skill in the art may understand that all or some of the steps of the foregoing implementations may be implemented by hardware, and may also be implemented by a program instructing relevant hardware. The program may be stored in a computer readable storage medium. The storage medium may be a ROM, a magnetic disk, or an optical disk.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for quality of service (QOS) information transmission, comprising:

transmitting, by a first entity, first QoS information to a second entity, the first QoS information being used for ensuring restriction on a first network slice for a terminal, and the first QoS information comprising a slice maximum bitrate (SMBR) for the terminal, wherein:

(a) the first entity is a first access and mobility management function (AMF), and the second entity is a current base station or a serving gNB, wherein the first QoS information is transmitted to the second entity in an applicable scenario, wherein the applicable scenario comprises at least one of: context setup, context modification, protocol data unit (PDU) session establishment; or (b) the first entity is the first AMF and the second entity is a target base station, wherein the first QoS information is transmitted to the second entity in an applicable scenario, wherein the applicable scenario comprises handover, and wherein the first QoS information is transmitted to the second entity by transmitting, by the first AMF, a handover request message to the target base station, wherein the handover request message carries the first QoS information; or (c) the first entity is an anchor base station and the second entity is the current base station, wherein the first QoS information is transmitted to the second entity in an applicable scenario, and the applicable scenario comprises context retrieval;

wherein when the first entity is the first AMF and the second entity is the current base station or the serving qNB, the applicable scenario is the context setup, transmitting, by the first entity, the first QoS information to the second entity comprises: transmitting, by the first AMF, an initial context setup request to the current base station or the serving qNB, wherein the initial context setup request carries the first Qos information.

2. The method of claim 1, wherein when the first entity is the first AMF and the second entity is the current base station or the serving gNB, the applicable scenario is the context modification, and transmitting, by the first entity, the first QoS information to the second entity comprises:

transmitting, by the first AMF, a user equipment (UE) context modification request to the current base station, wherein the UE context modification request carries the first QoS information.

3. The method of claim 1, wherein, when the first entity is the first AMF and the second entity is the current base station or the serving gNB, the applicable scenario is the PDU session establishment, and transmitting, by the first entity, the first QoS information to the second entity comprises:

transmitting, by the first AMF, a PDU session resource setup request to the current base station, wherein the PDU session resource setup request carries the first QoS information.

4. The method of claim 1, wherein when the first entity is the anchor base station and the second entity is the current base station, transmitting, by the first entity, the first QoS information to the second entity comprises:

transmitting, by the anchor base station, a UE context retrieval response to the current base station, wherein the UE context retrieval response carries the first QoS information.

5. A network device being a second entity, comprising:

a processor;

a transceiver coupled with the processor; and a memory configured to store instructions executable by the processor, wherein the processor is configured to load and execute the executable instructions to:

cause the transceiver to receive first quality of service (QOS) information transmitted by a first entity; or obtain the first QoS information pre-configured;

wherein the first QoS information is used for ensuring requirement or restriction on a first network slice or a first network slice group for a terminal, and the first QoS information comprises a slice maximum bitrate (SMBR), wherein the first QoS information further comprises at least one of a slice identifier, an uplink direction identifier, a downlink direction identifier, or an uplink-and-downlink direction identifier, wherein:

(a) the first entity is a first access and mobility management function (AMF), the second entity is a current base station or a serving gNB, wherein the first QoS information is transmitted to the second entity in an applicable scenario, wherein the applicable scenario comprises at least one of: context setup, context modification, protocol data unit, PDU, session establishment; or (b) the first entity is the first AMF, the second entity is a target base station, wherein the first QoS information is transmitted to the second entity in an applicable scenario, wherein the applicable scenario comprises handover, and wherein the first QoS information is carried in a handover request message; or (c) the first entity is an anchor base station and the second entity is the current base station, the first QoS information is transmitted to the second entity in an applicable scenario, and the applicable scenario comprises context retrieval;

wherein when the first entity is the first AMF and the second entity is the current base station or the serving qNB, the applicable scenario is the context setup, the transceiver configured to receive the first QoS information is configured to:

receive an initial context setup request from the first AMF, wherein the initial context setup request carries the first QoS information.

6. A network device being a first entity, comprising:

a processor; a transceiver coupled with the processor; and a memory configured to store instructions executable by the processor, wherein the processor is configured to load and execute the executable instructions to:

cause the transceiver to transmit first QoS information to a second entity, the first QoS information being used for ensuring restriction on a first network slice for a terminal, and the first QoS information comprising a slice maximum bitrate (SMBR) for the terminal, wherein: (a) the first entity is a first access and mobility management function (AMF), and the second entity is a current base station or a serving gNB, wherein the first QoS information is transmitted to the second entity in an applicable scenario, wherein the applicable scenario comprises at least one of: context setup, context modification, protocol data unit (PDU) session establishment; or (b) the first entity is the first AMF and the second entity is a target base station, wherein the first QoS information is transmitted to the second entity in an applicable scenario, wherein the applicable scenario comprises handover, and wherein the first QoS information is transmitted to the second entity by transmitting, by the first AMF, a handover request message to the target base station, wherein the handover request message carries the first QoS information; or (c) the first entity is an anchor base station and the second entity is the current base station, wherein the first QoS information is transmitted to the second entity in an applicable scenario, and the applicable scenario comprises context retrieval;

wherein when the first entity is the first AMF and the second entity is the current base station or the serving qNB, the applicable scenario is the context setup, the transceiver configured to transmit the first QoS information to the second entity is configured to:

transmit an initial context setup request to the current base station or the serving gNB. wherein the initial context setup request carries the first QoS information.

7. The network device of claim 6, wherein when the first entity is the first AMF and the second entity is the current base station or the serving gNB, the applicable scenario is the context modification, and the transceiver configured to transmit the first QoS information to the second entity is configured to:

transmit a user equipment (UE) context modification request to the current base station, wherein the UE context modification request carries the first QoS information.

* * * * *